United States Patent [19]
Bartee et al.

[11] Patent Number: 5,023,396
[45] Date of Patent: Jun. 11, 1991

[54] POP-UP SERVICE FITTING

[75] Inventors: Edward C. Bartee, Fairfield, Ohio; Donald L. Chapman, Liberty, Ind.

[73] Assignee: Square D Company, Palatine, Ill.

[21] Appl. No.: 321,927

[22] Filed: Mar. 10, 1989

[51] Int. Cl.[5] .................................. H02G 3/08
[52] U.S. Cl. ...................... 174/48; 174/57; 439/131
[58] Field of Search ............ 174/48, 57; 220/3.7; 439/131, 925; 52/221

[56] References Cited

U.S. PATENT DOCUMENTS

| 2,811,574 | 10/1957 | Guerrero | 174/48 X |
|---|---|---|---|
| 3,433,886 | 3/1969 | Myers | 174/57 |
| 3,550,336 | 12/1970 | Halkovich et al. | 52/127 |
| 3,646,244 | 2/1972 | Cole | 174/48 X |
| 3,794,956 | 2/1974 | Dubreuil | 174/48 X |
| 3,972,579 | 8/1976 | Kohaut | 439/131 |
| 4,059,321 | 11/1977 | Rasmussen et al. | 439/131 |
| 4,237,666 | 12/1980 | Kohaut | 52/221 |
| 4,511,198 | 4/1985 | Mitchell et al. | 439/131 |
| 4,551,577 | 11/1985 | Byrne | 174/57 |

FOREIGN PATENT DOCUMENTS 963411 2/1975 Canada .................................. 52/220

Primary Examiner—Leo P. Picard
Assistant Examiner—David A. Tone
Attorney, Agent, or Firm—Larry I. Golden; David R. Stacey; L. Wayne Beavers

[57] ABSTRACT

An electrical service fitting apparatus includes a base frame having a frame opening defined therethrough. An extensible service fitting is disposed through the frame opening and movable relative to the base frame between a retracted position and an extended position. The base frame has a plurality of grooves defined therein which open into the frame opening. The service fitting has a plurality of elongated ribs defined thereon which are received in the grooves so that the ribs may slide in the grooves to guide the service fitting as it moves between its retracted and extended position. A pair of coiled tape springs are connected between the base frame and the service fitting to bias the service fitting toward its extended position. Two sliding latches are provided to lock the service fitting in its retracted position. A top plate of the service fitting has access openings defined therein through which attachment devices can be accessed so as to mount the apparatus on a duct placed in a concrete floor.

16 Claims, 4 Drawing Sheets

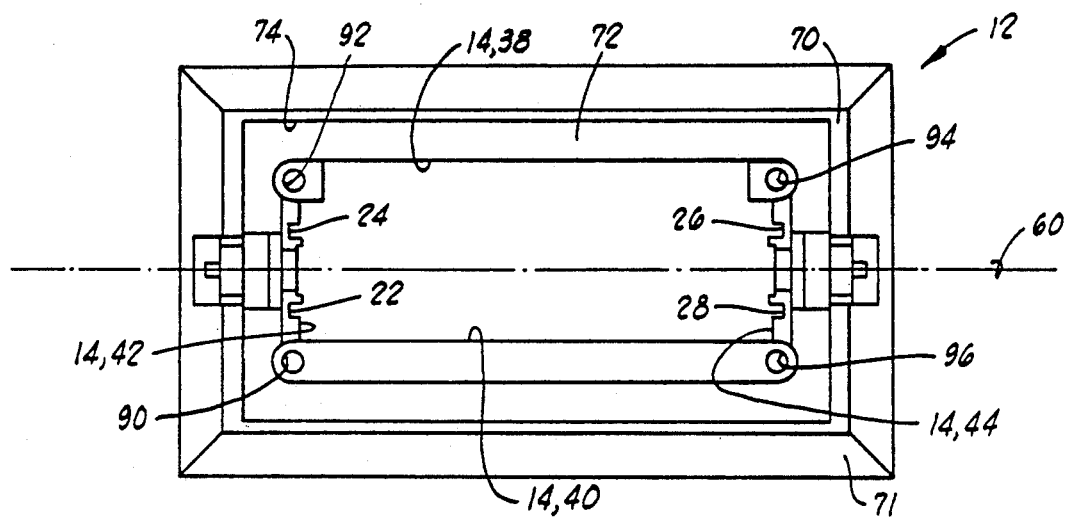
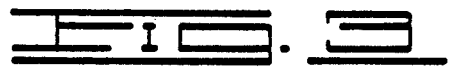
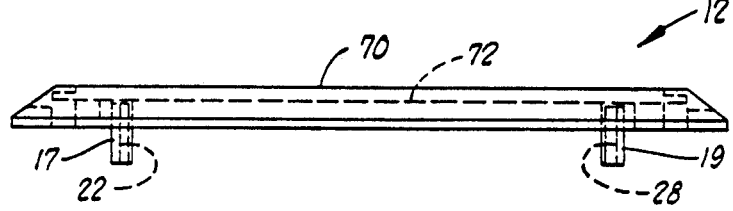
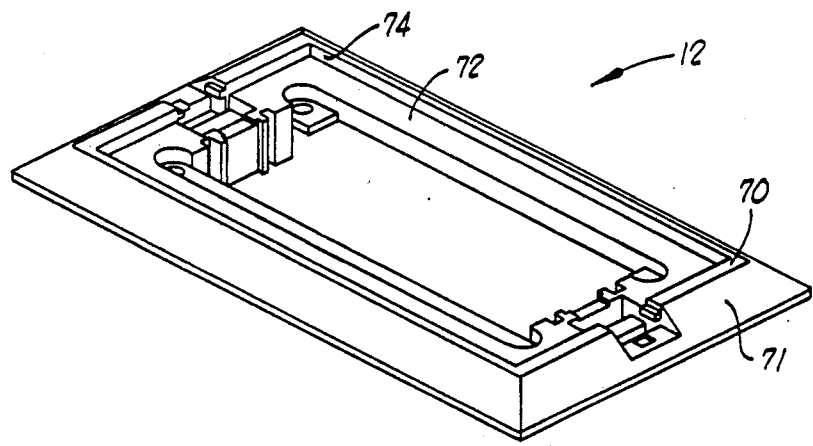
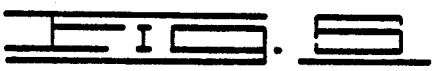
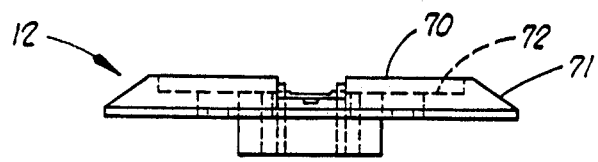
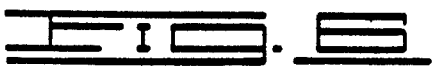

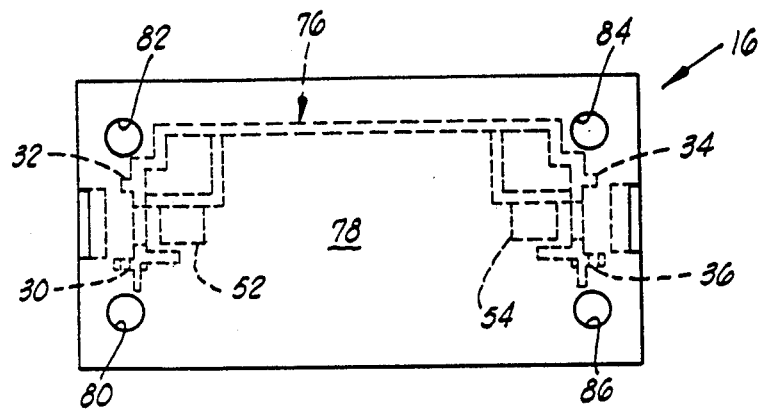
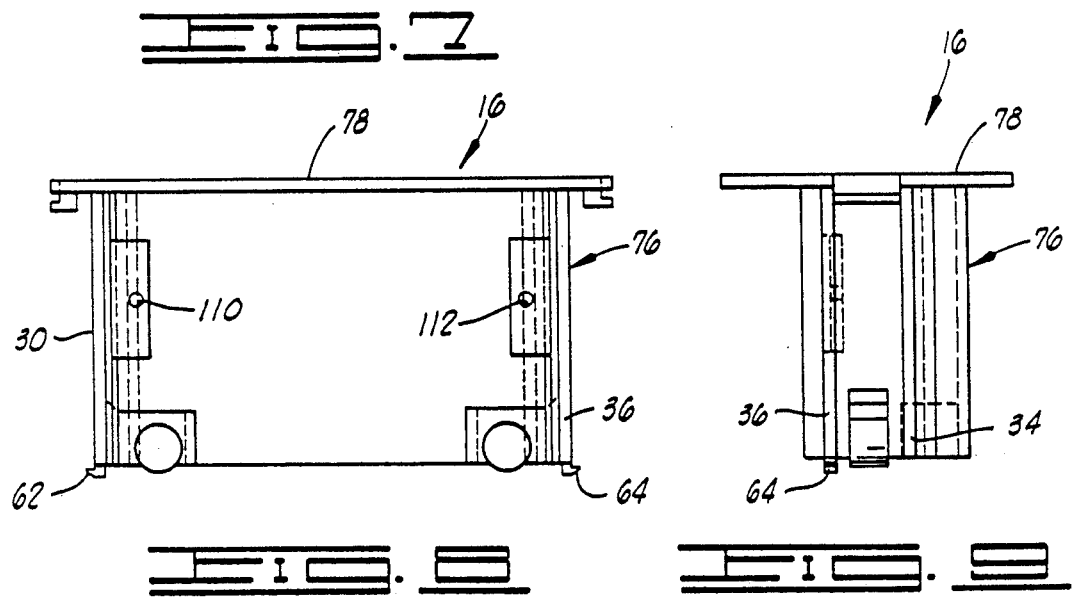
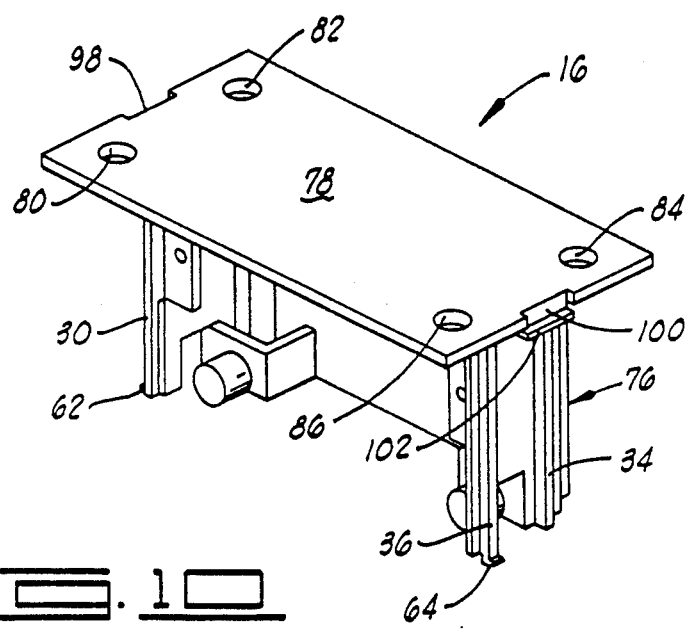

POP-UP SERVICE FITTING

This invention relates generally to service fittings for use with an electrical raceway system designed to be placed in a floor, and more particularly to pop-up service fittings of the type which can be retracted to a hidden position within the floor or extended to an operating position above the floor.

BACKGROUND OF THE INVENTION

There are several well known types of electrical raceway systems which are designed to be placed in a floor. There are, for example, "underfloor raceways" as defined in Article 354 of the National Electrical Code of "cellular metal floor raceways" as defined in Article 356 of the National Electrical Code.

Service fittings designed for use in either of the two mentioned raceway systems, and conceivably in some other systems, can generally be referred to as service fittings for use with a raceway system designed to be placed in a floor. It should be noted that when the service fitting is referred to as a service fitting for an electrical raceway system to be placed in a floor, it is the raceway system which is placed in the floor, not necessarily the entirety of the service fitting.

As used herein, the simple term "duct" or "raceway", or the phrase "raceway system for placement in a floor" or the like are intended to refer in a generic sense to an "underfloor raceway" or to a "cellular metal floor raceway" or both. Where the term "underfloor duct" or "underfloor raceway" is used, it is intended as a reference to the particular type of system defined in Article 354 of the National Electrical Code.

The service fitting disclosed in this application is designed primarily for use with an underfloor duct for use as part of an underfloor raceway, and is illustrated and described as such herein. It can, however, be used as part of a cellular metal floor raceway system and thus is generically referred to as service fitting for an electrical raceway system to be placed in a floor.

Underfloor duct is an electrical raceway system designed to be imbedded in the concrete floor of offices, classrooms, laboratories, manufacturing areas, supermarkets, etc., for the purpose of providing an enclosed raceway for wires and cables from their originating panel to their point of use. Such an underfloor raceway system includes two types of ducts, namely feeder ducts and distribution ducts. Complementing these two types of ducts are junction boxes, support couplers and supports, horizontal and vertical elbows, power and telephone outlets and numerous cast and sheet metal fittings such as conduit adapters, change of direction duct runs, "Y" takeoffs, etc.

Typical service fittings designed for use with the distribution ducts of such underfloor duct systems are monument fittings, flush fittings or recessed fittings.

Monument fittings are those which include a rigid framework which mounts at the floor level and is communicated with the distribution duct through a vertical extension of the duct. The rigid monument fitting framework has an opening in which a power outlet, telephone outlet, computer outlet or the like is connected.

The difficulty with fixed monument fittings is their permanent location and the fact that they are sometimes damaged due to their exposure, or that they sometimes interfere with placement of furniture or movement of personnel in the building.

One alternative to such fixed monument fittings is a recessed service fitting composed of a tile or carpet ring, a door which when closed is flush with the floor and various hardware components that make up the interior of the service fitting and are recessed into the floor. To access the power receptacles of such a recessed service fitting, one must open the door, reach down into the fitting, then close the door and allow the wires to exit out through a convenient opening. This operation can be tedious if one has to access the fitting very often. Also, there is a general fear of some office workers of reaching down into the fitting.

Typical examples of such recessed service fittings are seen in U.S. Pat. No. 4,237,666 to Kohaut (See FIG. 6), and U.S. Pat. No. 3,932,696 to Fork et.al. (See FIG. 28).

A typical example of a flush floor service fitting is seen in U.S. Pat. No. 4,443,654 to Flachbarth et.al.

Also, the prior art has included service fittings for use with electrical raceway systems, which service fittings are pop-up fittings of the type that can be retracted to a hidden position and extended to an operating position.

Many of the disadvantages of both fixed monument fittings and hidden recessed fittings are overcome by these pop-up fittings which are initially hidden in the floor until they are needed, at which time they can be extended to above the floor level.

U.S. Pat. No. 3,794,956 to Dubreuil discloses a recessible electrical floor outlet assembly. The service fitting of Debreuil as best seen in FIG. 3 thereof is spring-biased toward an extended position. Latching devices are provided for releasably locking the service fitting in a retracted position. As seen in FIG. 7, the Dubreuil device has guide rods upon which the extensible member slides.

U.S. Pat. No. 3,433,886 to Myers discloses a recessible electric service device which is manually extendable and utilizes threaded rods to hold the service fitting in either an extended or retracted position.

U.S. Pat. No. 2,811,574 to Guerrero discloses a manually adjustable electric floor receptacle which has grooves in a cylindrical extendable member which are engaged by lugs in the fixed member to prevent rotation of the extendable member.

U.S. Pat. No. 3,646,244 to Cole discloses another manually extendable service fitting designed to be placed in a floor.

Extendable electrical service fittings have also been designed for placement in other structures, such as a wall or even in furniture.

U.S. Pat. No. 2,196,842 to Strazzabosco discloses an extendable wall socket.

U.S. Pat. No. 4,511,198 to Mitchell et.al. discloses a pop-up electrical receptacle unit designed for placement in a desk. The metchell et.al. apparatus is spring-biased toward an extended position.

U.S. Pat. No. 4,747,788 to Byrne discloses a manually retractable power center designed for placement in furniture.

U.S. Pat. No. 4,507,900 to Landis shows a floor fitting which can be arranged flush with the floor or can be pivoted up about one edge for assembly with a fixed monument type housing.

SUMMARY OF THE INVENTION

The present invention provides an improved pop-up type electrical service fitting apparatus.

The electrical service fitting apparatus includes a base frame having a generally rectangular frame opening defined therethrough. An extensible service fitting is disposed through the frame opening and movable relative to the base frame between a retracted position and an extended position.

The base frame has a plurality of grooves defined therein. The service fitting has a plurality of elongated ribs which are received in the grooves so that the ribs may slide in the grooves to guide the service fitting as it moves between its said retracted and extended positions.

The service fitting is biased toward its extended position by first and second coiled tape spring means located at opposite positions adjacent the frame opening and connected between the base frame and the service fitting.

Additionally, the service fitting is designed with access openings therein which provide for a novel means of mounting the service fitting apparatus in a floor.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 3 is a plan view of the base frame of the service fitting apparatus.

FIG. 4 is a side elevation view of the base frame of FIG. 3.

FIG. 5 is a top front perspective view of the base frame of FIG. 3.

FIG. 6 is an end elevation view of the base frame of FIG. 3.

FIG. 7 is a plan view of the extensible service fitting which fits in the base frame of FIG. 3.

FIG. 8 is a front elevation view of the service fitting of FIG. 7.

FIG. 9 is a right-end elevation view of the service fitting of FIG. 7.

FIG. 10 is a top front perspective view of the service fitting of FIG. 7.

DETAILED DESCRIPTION OF THE PREFERRED EMBODIMENTS

Figure 1:
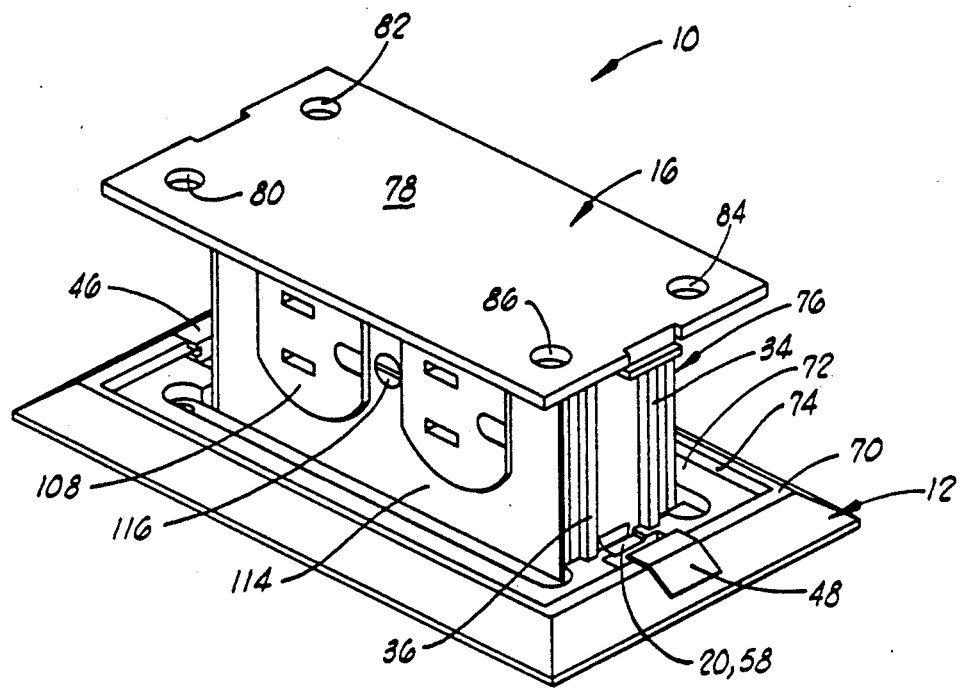
FIG. 1 is a top front perspective view of the electrical service fitting apparatus in its extended position.
Figure 2:
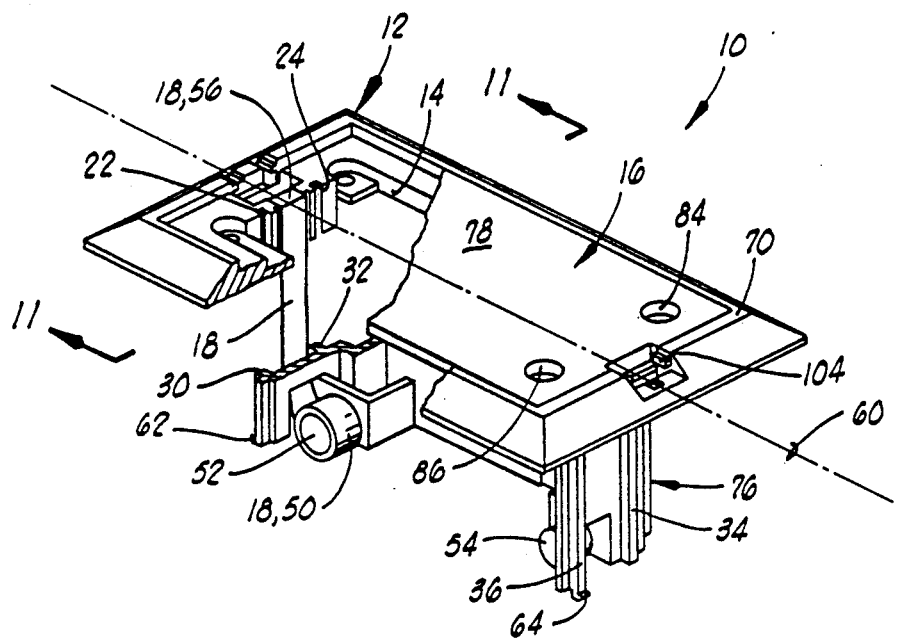
FIG. 2 is a top front perspective view similar to FIG. 1 showing the apparatus in a retracted position, with the service fitting partially cut away to show the details of construction of the coiled tape spring.

Referring now to the drawings, and particularly to FIGS. 1 and 2, an electrical service fitting apparatus is thereshown and generally designated by the numeral 10. The apparatus 10 includes a base frame 12 having a frame opening 14 defined therethrough.

The apparatus 10 further includes an extensible service fitting generally designated by the numeral 16 which is disposed through the frame opening 14 and is movable relative to the base frame 12 between a retracted position as shown in FIG. 2 and an extended position as shown in FIG. 1.

First and second coiled tape spring means 18 and 20 are located at opposing positions adjacent the frame opening 14 and are connected between the base frame 12 and the extensible service fitting 16 for biasing the service fitting 16 toward its extended position of FIG. 1.

The base frame 12 is best shown in FIGS. 3-6. Base frame 12 includes four vertical grooves 22, 24, 26 and 28. The grooves 22 through 28 open into and communicate with the frame opening 14. The grooves 22 through 28 are located in relatively short vertical panel portions 17 and 19 of base frame 12. The entire base frame 12 is preferably integrally constructed by injection molding of a suitable plastic material.

The extensible service fitting 16 has four elongated ribs 30, 32, 34 and 36 defined thereon. The ribs 30 through 36 are received in the grooves 22 through 28, respectively, so that the ribs 30 through 36 may slide in the grooves 22 through 28 to guide the extensible service fitting 16 as it moves between its retracted and extended positions.

As best seen in FIG. 3, the frame opening 14 is generally rectangular in shape having two longer sides 38 and 40 and two shorter sides 42 and 44.

The preferred groove and rib arrangement can generally be described as having at least one groove and associated rib located on each of two opposite sides of the frame opening. Preferably, two spaced parallel grooves such as 22 and 24 and associated ribs such as 30 and 32, respectively, are located on each of the two opposite sides such as 42 and 44 of the frame opening 14.

The two coiled tape spring-biasing means 18 and 20 are also preferably located adjacent the opposite sides 42 and 44 of frame opening 14. Each coiled tape spring is preferably located between the two spaced grooves and associated ribs of its respective side of the frame opening 14. For example, coiled tape spring 18 is located between grooves 22 and 24 and between ribs 30 and 32.

As is best seen in FIG. 1, the electrical service fitting apparatus 10 includes two latch means 46 and 48 for latching the extensible service fitting 16 in its retracted position as shown in FIG. 2. The latch means 46 and 48 have been removed in FIG. 2 in order to make visible other components of the apparatus 10. The latch means 46 and 4B are also located adjacent the two opposite sides 42 and 44 of frame opening 14.

As best seen in FIG. 2, each of the coiled tape spring means such as spring 18 has a coil 50 mounted on a cylindrical knob 52 or 54 of service fitting 16, and has a free end such as 56 attached to the base frame 12. In FIG. 1, a free end 58 of coiled tape spring 20 is visible.

These coiled tape type springs 18 and 20 are commercially available and function much in the manner of a spring loaded measuring tape. The free end 56 of the coil tape spring 18 may be extended away from the coil 50 as shown in FIG. 2. This extension causes the remaining portion of the coil 50 to coil ever tighter thus applying a tension on the free end portion 56 of the spring. This type of spring provides a relatively constant tension force.

The first and second coiled tape springs 18 and 20 are located substantially on a center line 60 of the service fitting 14. The center line 60 spans the two shorter sides 42 and 44 of the frame opening 14. The first and second latches 46 and 48 are also each substantially centered on the center line 60.

By locating the springs 18 and 20 and latches 46 and 48 along center line 60, and by equally spacing the ribs 22 through 28 on opposite sides of center line 60, the biasing forces acting on the extensible service fitting 16 are balanced so as to provide a smooth sliding action of the extensible service fitting 16 within the base frame 12.

The ribs 30 and 36 each have outwardly extending lips 62 and 64, respectively, defined on lower portions thereof for abutting the base frame 12 and defining the upwardly extended position illustrated in FIG. 1 of the service fitting 16 relative to the base frame 12.

The portions of extensible service fitting 16 upon which the lower portions of ribs 30 and 36 are defined are laterally resilient so that the lips 62 and 64 can initially pass downward through grooves 22 and 28, respectively, to permit the service fitting 16 to be assembled with the base frame 12.

Figure 11:
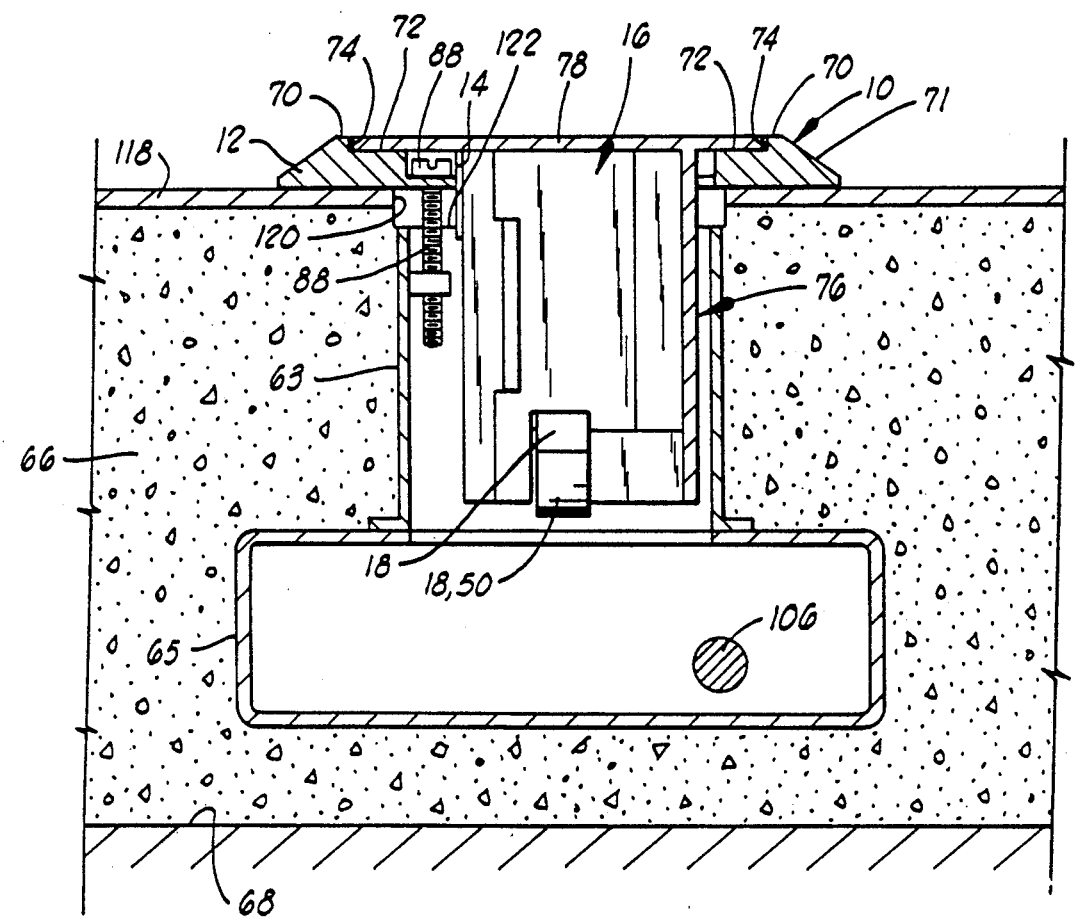
FIG. 11 is an elevation sectioned view taken along line 11—11 of FIG. 2 of the service fitting apparatus in a retracted position in place within a concrete floor and mounted upon a vertical extension of an underfloor duct.

FIG. 11 illustrates the electrical service fitting apparatus 10 assembled with a vertical preset extension 63 of an underfloor duct 65, all of which is located in a poured concrete floor 66 on top of a base slab 68.

The base frame 12 has an uppermost surface 70 and a recessed upward facing surface 72. The recessed surface 72 is located adjacent frame opening 14 and extends laterally beyond the frame opening 14 to an outer perimeter 74 of the recessed surface 72. An outer edge portion 71 of base frame 12 is chamfered.

The extensible service fitting 16 can generally be described as having a vertically oriented portion 76 received through the frame opening 14, and having an upper plate 78 attached to the vertically oriented portion 76 and dimensioned to fit closely within the outer perimeter 74 of recessed surface 72 and to fit flush with the uppermost surface 70 of base frame 12 when the service fitting 16 is in its retracted position as seen in FIG. 11.

The vertically oriented portion 76 of service fitting 16 is of a relatively complicated thin wall construction, the details of which are seen in dashed lines in FIG. 7. The entire service fitting 16 is preferably integrally constructed by injection molding of a suitable plastic material.

The upper plate 78 has a plurality of access openings 80, 82, 84 and 86 defined therein through which a screwdriver or the like can be inserted to access a plurality of attachment means such as screw 88 (see FIG. 11) so that the apparatus 10 can be mounted on the extension 63 of duct 65 as seen in FIG. 11.

As best seen in FIG. 3, the base frame 12 includes a plurality of openings 90, 92, 94 and 96 through which such screws 88 are inserted to rigidly attach the base frame 12 to the extension 63 of duct 65.

It is preferred when the apparatus 10 is mounted upon the extension 63 of duct 65 that the access openings 80 through 86 be closed in some suitable fashion. This can be accomplished by inserts which are pressed into place within the openings 80 through 86 after the apparatus 10 has been mounted, or the threaded fasteners such as 88 may have decorative heads (not shown) formed thereon which fill the access openings 80 through 86 and are flush with the top surface of plate 78.

As best shown in FIG. 10, the top plate 78 of extensible service fitting 16 has lateral recesses 98 and 100 defined therein and has a laterally outward extending lip such as 102 located below each recess 98 and 100. The latch means 46 and 48 are sliding latches mounted upon horizontal ribs 104 (see FIG. 2), and are adapted to slide over the laterally outward extending lips 102 to latch the service fitting 16 in its retracted position of FIG. 2. To release the extensible service fitting 16, the sliding latches 46 and 48 are moved laterally outward away from each other so that the springs 18 and 20 can then force the extensible service fitting 16 upward to its extended position of FIG. 1.

The manner of assembly and mounting of the apparatus 10 is as follows. The base frame 12 and extensible service fitting 16 will generally be assembled together when they are received by the building contractor. Prior to mounting the apparatus 10 on the extension 63 of duct 65, electrical wiring schematically illustrated as 106 will be pulled to an appropriate location in duct 65 adjacent the extension 63.

Then, with the service fitting 16 locked in the base frame 12 in its retracted position, the vertically oriented portion 76 of service fitting 16 will be inserted downward into the preset extension 63 and the base frame 12 will be attached thereto by the threaded screws 88 as previously described.

Then, the latches 46 and 48 will be moved laterally outward to release the service fitting 16 and allow it to be moved upward to its extended position by the force of springs 18 and 20.

Next, a duplex electrical outlet 108 (see FIG. 1) or other electrical outlet such as a telephone or computer wiring outlet, will be connected to the wiring 106 and mounted on the service fitting 16 through the use of mounting holes 110 and 112 (see FIG. 8). A cover plate 114 (see FIG. 1) will be mounted on the duplex outlet 108 by a screw 116.

As is apparent in FIG. 1, the base frame 12 will typically rest upon tile 118 or other floor covering which covers the concrete floor 66. An opening 120 has been cut through the tile 18 and a thin upper portion of concrete 66 to expose an upper end 122 of preset extension 63. As will be understood by those skilled in the art, the upper end 122 will typically be initially plugged by a plug which must be removed prior to mounting of the electrical service fitting apparatus 10.

As seen in FIG. 11, when the service fitting 16 is in its retracted position, it is received within the interior of the vertical preset extension 63 of duct 65. The service fitting 16 should not, however, extend downward into the duct 65 itself, as that would interfere with the wiring contained in the duct 65.

Thus it is seen that the apparatus of the present invention readily achieves the ends and advantages mentioned as well as those inherent therein. While certain preferred embodiments of the purposes of the present disclosure, numerous changes in the arrangement and construction of parts may be made by those skilled in the art which changes are encompassed within the scope and spirit of the present invention as defined by the appended claims.

What is claimed is:

1. An electrical service fitting apparatus, comprising:
   a base frame having a generally rectangular frame opening defined therethrough;
   an extensible service fitting disposed through said frame opening and movable relative to said frame between a retracted position and an extended position;
   said base frame having a plurality of grooves defined therein, said grooves opening into and communicating with said frame opening;
   said service fitting having a plurality of elongated ribs defined thereon, said ribs being received in said grooves so that said ribs may slide in said grooves to guide said service fitting as it moves between said retracted and extended positions, at least one groove and associated rib being located on each end of two opposite sides of said frame opening; and spring biasing means for biasing said service fitting toward said extended position.

2. The apparatus of claim 1, wherein:

at least one of said ribs has an outwardly extending lip defined on a lower portion thereof for abutting said base frame and defining said extended position of said service fitting relative to said base frame.

3. The apparatus of claim 2, wherein:

said one rib having said lip defined thereon is laterally resilient so that said lip can initially pass through the groove associated with said one rib to permit said service fitting to be assembled with said base frame.

4. The apparatus of claim 1 wherein said spring biasing means includes two spring members, one of said spring members located at each end of said two opposite sides of said frame opening.

5. The apparatus of claim 4, wherein:

at least two spaced grooves and associated ribs are located on each of said two opposite sides of said frame opening and one of said spring members being located between each said two spaced grooves and associated ribs on each side of said frame opening.

6. The apparatus of claim 5, wherein:

each of said two spring biasing means is a coiled tape spring.

7. The apparatus of claim 5, further comprising:

two latch means for latching said service fitting in its said retracted position, one of said latch means being located adjacent each of said two opposite sides of said frame opening.

8. An electrical service fitting apparatus comprising:

a base frame having a frame opening defined therethrough;

an extensible service fitting disposed through said frame opening and movable relative to said base frame between a retracted position and an extended position; and first and second spring means, located at opposing positions adjacent said frame opening and connected between said base frame and said service fitting, for biasing said service fitting toward its said extended position.

9. The apparatus of claim 8, wherein:

each of said first and second spring means is a coiled tape spring means.

10. The apparatus of claim 9, wherein:

each of said coiled tape spring means has a coil mounted on said service fitting and a free end attached to said base frame.

11. The apparatus of claim 9, wherein:

said frame opening is generally rectangular in shape; and said first and second coiled tape spring means are located adjacent first and second opposite sides of said frame opening.

12. The apparatus of claim 11, wherein:

each of said first and second coiled tape spring means are located substantially on a center line of said service fitting, said center line spanning said first and second opposite sides of said frame opening.

13. The apparatus of claim 12, further comprising:

first and second latch means for latching said service fitting in its said retracted position, said first and second latch means being located adjacent said first and second opposite sides respectively, of said frame opening and being substantially centered on said center line.

14. An electrical service fitting apparatus to use with a duct to be placed in a floor, comprising:

a base frame having a frame opening defined therethrough and having an uppermost surface and a recessed upward facing surface, said recessed surface being adjacent said frame opening and extending laterally beyond said frame opening to an outer perimeter of said recessed surface;

a plurality of attachment means for attaching said base frame to said cut, said attachment means being located within said outer perimeter of said recessed surface; and an extensible service fitting movable relative to said base frame between a retracted position and an extended position, said service fitting having a vertically oriented portion received through said frame opening and having an upper plate attached to said vertically oriented portion and dimensioned to fit closely within said outer perimeter of said recessed surface and o fit flush with said uppermost surface when said service fitting is in said retracted position, said upper plate having a plurality of access openings defined therein through which said plurality of attachment means can be accessed so that said apparatus can be mounted on said duct.

15. The apparatus of claim 14, wherein:

said upper plate of said extensible service fitting has a lateral recess defined therein and has a laterally outwardly extending lip located below said lateral recess; and said base frame includes a latch means, adapted to engage said laterally outwardly extending lip, for latching said service fitting in its said retracted position.

16. The apparatus of claim 15, further comprising:

spring biasing means, operably associated with said base frame and said service fitting, for resiliently biasing said service fitting toward its said extended position.

* * * * *